US006040670A

United States Patent [19]

Kaneko et al.

[11] Patent Number: 6,040,670

[45] Date of Patent: Mar. 21, 2000

[54] CONTROLLER FOR PRINTER CARRIAGE MOTOR

[75] Inventors: Masanori Kaneko, Fountain Valley; Akihiko Sukigara, Irvine, both of Calif.

[73] Assignee: Canon Kabushiki Kaisha, Tokyo, Japan

[21] Appl. No.: 09/019,189

[22] Filed: Feb. 5, 1998

[51] Int. Cl.$^{7}$ .............................. H02P 5/06

[52] U.S. Cl. .............. 318/561; 318/811; 388/804; 388/811; 347/19

[58] Field of Search .............. 347/19; 318/561, 318/564, 568.21, 625, 811, 432, 434; 388/804, 811

[56] References Cited

U.S. PATENT DOCUMENTS

| | | | |
|---|---|---|---|
| 4,047,479 | 9/1977 | McKay et al. | 101/36 |
| 4,490,796 | 12/1984 | Bigbie et al. | 395/113 |
| 4,692,778 | 9/1987 | Yoshimura et al. | 346/145 |
| 4,742,470 | 5/1988 | Juengel | 364/474.21 |
| 4,775,945 | 10/1988 | Cavill et al. | 395/105 |
| 4,872,027 | 10/1989 | Buskirk et al. | 347/19 |
| 4,962,390 | 10/1990 | Yoshimura et al. | 346/140 |
| 5,090,827 | 2/1992 | Hirano et al. | 400/185 |
| 5,231,649 | 7/1993 | Duncanson | 375/260 |
| 5,258,773 | 11/1993 | Arakawa et al. | 346/1.1 |
| 5,266,974 | 11/1993 | Koitabashi et al. | 346/140 |
| 5,416,395 | 5/1995 | Hiramatsu | 318/600 |
| 5,495,271 | 2/1996 | Koitabashi et al. | 347/23 |
| 5,512,926 | 4/1996 | Uchikata et al. | 347/86 |
| 5,534,898 | 7/1996 | Kashino et al. | 347/33 |
| 5,534,899 | 7/1996 | Uchikata et al. | 347/49 |
| 5,670,997 | 9/1997 | Sugimoto et al. | 347/30 |
| 5,671,000 | 9/1997 | Hirabayashi et al. | 347/86 |
| 5,786,828 | 7/1998 | Yamamoto | 347/19 |
| 5,812,156 | 9/1998 | Bullock et al. | 347/19 |
| 5,815,192 | 9/1998 | Matsuo et al. | 347/238 |

*Primary Examiner*—Brian Sircus
*Attorney, Agent, or Firm*—Fitzpatrick, Cella, Harper & Scinto

[57] ABSTRACT

In a multiple print head printer in which print heads are removable and exchangeable, a method of controlling a printer carriage motor comprises the steps of receiving a print job, the print job comprising print commands and print data, determining a type of print mode to print the print data based on the received print commands, detecting a number of print heads installed in the multiple print head printer, selecting a motor control function for controlling operational speed and direction of the printer carriage motor based on the determined type of print mode and the detected number of print heads.

30 Claims, 8 Drawing Sheets

CONTROLLER FOR PRINTER CARRIAGE MOTOR

BACKGROUND OF THE INVENTION

1. Field of the Invention

The present invention is directed to a method for controlling the operation of a printer carriage motor. More specifically, the present invention relates to a method for controlling the motor acceleration/deceleration and/or hold time for a printer carriage motor in a multiple print head printer based on all or any of the following: cartridge type, number of cartridges installed, weight of cartridges, number of print heads installed in the printer, etc.

2. Description of Related Art

Conventional ink jet printers have either a single print head or a multiple print head arrangement for printing. In the latter case, printing speed of image data is increased using the multiple print head design. For example, U.S. patent application Ser. No. 08/901,560, filed Jul. 28, 1997, entitled Auto-Alignment System For A Printing Device, discloses an example of a method which increases the print speed of serial image printing while using two print heads, one to print the left half of a printed line, and the other to print the right half of a printed line, both halves being printed simultaneously. To achieve this result, the left and right print head assemblies are supported by common carriage mechanism and are driven by a common printer carriage motor. As a result, print speed is approximately doubled over that of a single print head device.

Conventionally, in multiple print head printers, it is possible to install either one or two print heads, and print heads which include one or more ink cartridges. However, due to the difference in physical weight of each of the different types of print heads and cartridges, as well as the number of print heads being utilized by the multiple print head, accurate movement of the print head carriage cannot be obtained using a single speed motor due to the number and weight of the print heads installed. That is, because the printer carriage motor conventionally operates at a fixed speed in a multiple print head printer, if the number of print heads is changed, the speed may be either too much or too little to ensure proper printing speed. For example, if only one print head is used in a multi-head printer which has a fixed speed motor, the carriage speed would become too fast causing the print head either to overshoot its destination because too much power is supplied to the print head carriage or not provide sufficient time for the print head to eject ink at specific locations along a printable scan line due to the fast movement. Alternatively, if more than one print head is used in which each of the print heads includes more than one ink cartridge, the speed of the print head carriage may be reduced due to the increased weight and the lack of power supplied to the printer carriage motor for moving the heavier print heads. As may be appreciated, this problem is compounded when using two or more print heads which use more than two ink reservoirs.

In view of the varied weight and number of print heads which can be used in a multiple print head printer, it is desirable to maintain a constant known speed of the printer carriage in order to ensure proper printing quality. Therefore, the number of print heads as well as the weight of the print heads used must be known in order to control the speed of the printer carriage motor so as to ensure accurate movement of the print head carriage.

SUMMARY OF THE INVENTION

It is an object of the invention to provide accurate control of the printer carriage motor based on any one of or a combination of the following: cartridge type, number of cartridges installed, weight of installed cartridges, number of print heads and the weight of the print heads being used by a multiple print head printer. As a result, using all or any of the above factors to control the speed of a printer carriage motor, proper speed of the printer carriage will be accurately ensured thereby overcoming the foregoing disadvantages of the prior art systems.

According to one aspect of the present invention, in a multiple print head printer in which print heads are removable and exchangeable, a method of controlling a printer carriage motor which includes the steps of receiving a print job, the print job comprising print commands and print data, determining a type of print mode to print the print data based on the received print commands, detecting a number of print heads installed in the multiple print head printer, selecting a motor control function for controlling operational speed and direction of the printer carriage motor based on the determined type of print mode and the detected number of print heads.

According to another aspect of the present invention, the invention is, in a multiple print head printer in which print heads are removable and exchangeable, a method of controlling a printer carriage motor which includes the steps of receiving a print job, the print job comprising print commands and print data, determining a type of print mode to print the print data based on the received print commands, detecting a number of print heads installed in the multiple print head printer, determining a total print head weight of the detected number of installed print heads, and selecting an operational speed for the printer carriage motor based on the determined printing mode and total print head weight.

DETAILED DESCRIPTION OF THE PREFERRED EMBODIMENT

Figure 1:
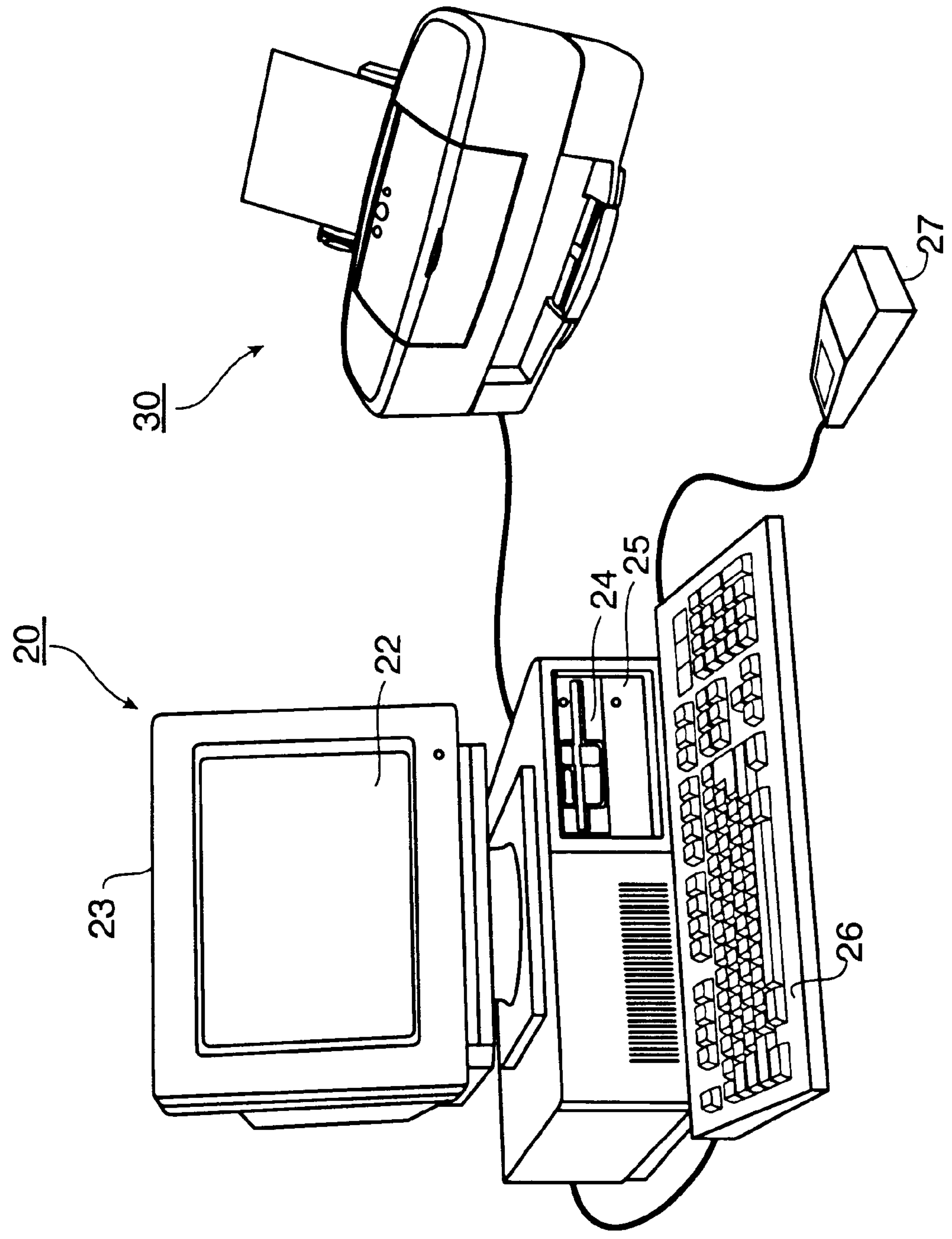
FIG. 1 shows a perspective view of computing equipment used in connection with the printer of the present invention.

FIG. 1 is a view showing the outward appearance of computing equipment used in connection with the invention described herein. Computing equipment 20 includes host processor 23. Host processor 23 comprises a personal computer (hereinafter "PC"), preferably an IBM PC-compatible computer having a windowing environment, such as Microsoft® Windows95. Provided with computing equipment 20 are display screen 22 comprising a color monitor or the like, keyboard 26 for entering text data and user commands, and pointing device 27. Pointing device 27 preferably comprises a mouse for pointing and for manipulating objects displayed on display screen 22.

Computing equipment 20 includes a computer-readable memory medium, such as fixed computer disk 25, and floppy disk interface 24. Floppy disk interface 24 provides a means whereby computing equipment 20 can access information, such as data, application programs, etc., stored on floppy disks. A similar CD-ROM interface (not shown) may be provided with computing equipment 20, through which computing equipment 20 can access information stored on CD-ROMs.

Disk 25 stores, among other things, application programs by which host processor 23 generates files, manipulates and stores those files on disk 25, presents data in those files to an operator via display screen 22, and prints data in those files via printer 30. Disk 25 also stores an operating system which, as noted above, is preferably a windowing operating system such as Windows95. Device drivers are also stored in disk 25. At least one of the device drivers comprises a printer driver which provides a software interface to firmware in printer 30. Data exchange between host processor 23 and printer 30 is described in more detail below.

In preferred embodiments of the invention, printer 30 is a multi-head serial printer. Accordingly, although the invention described herein is not limited to use with such a printer, the invention will be described in the context of a such a printer.

Figure 2:
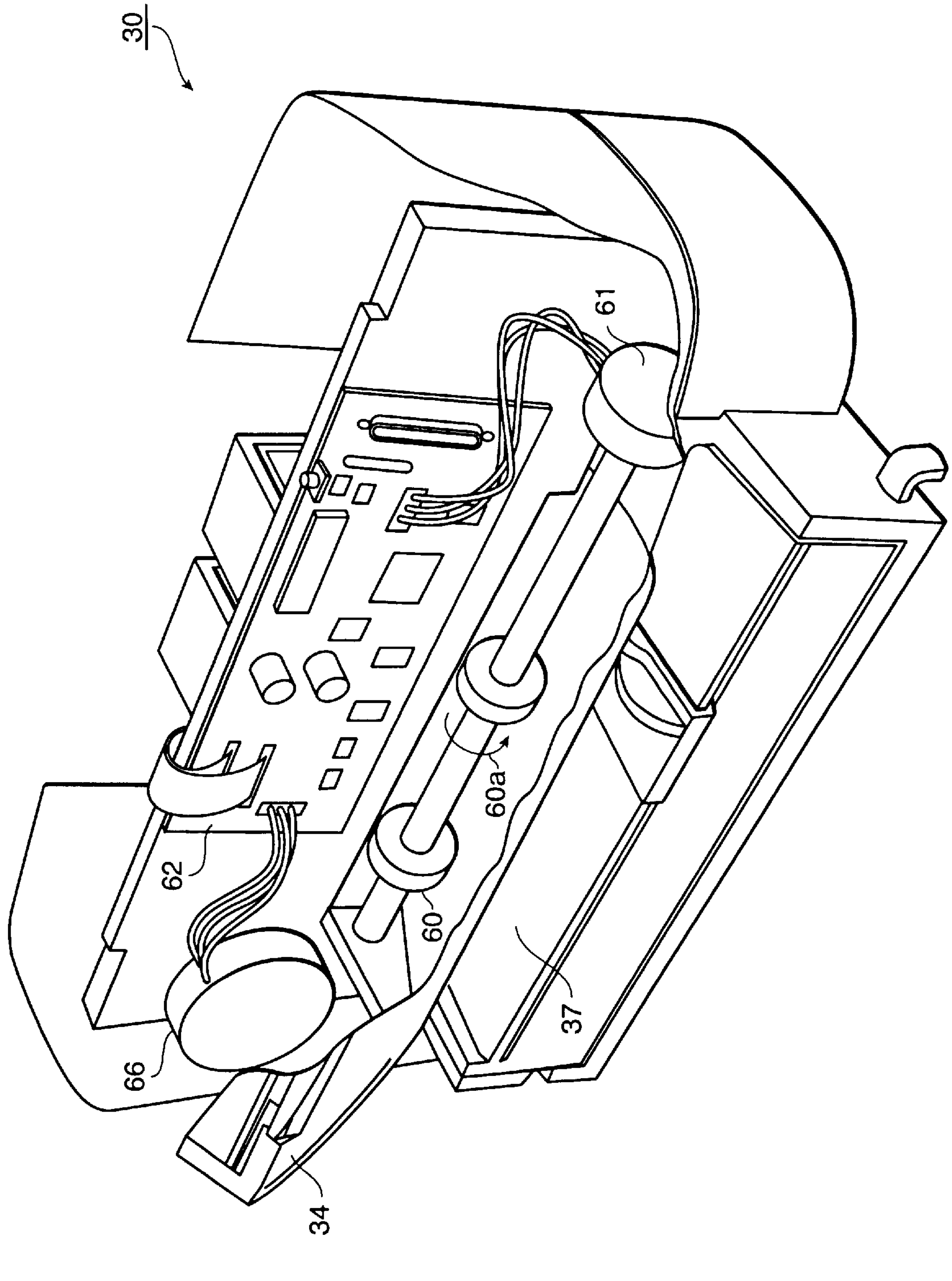
FIG. 2 is a back, cut-away perspective view of the printer shown in FIG. 1.
Figure 3:
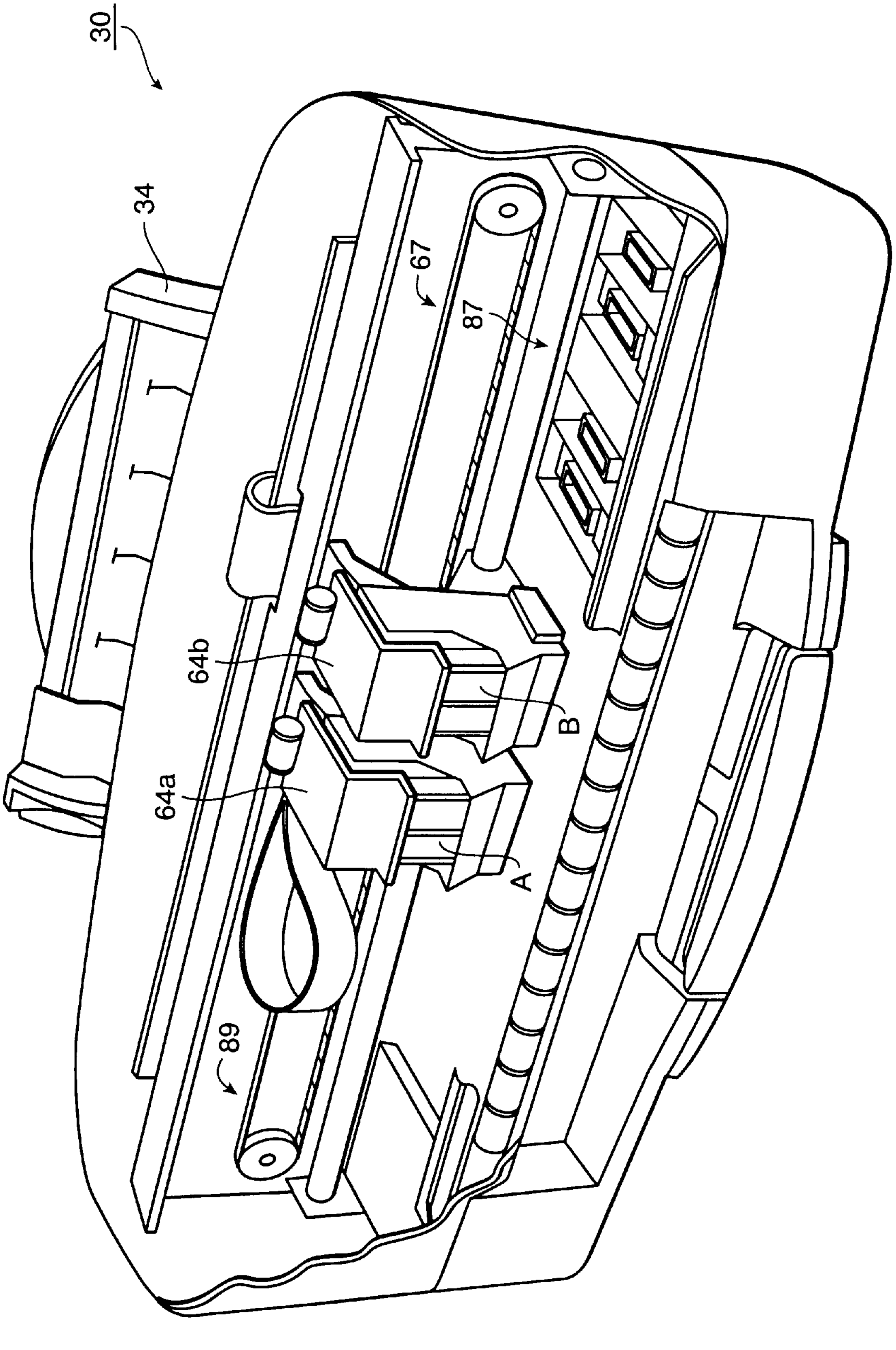
FIG. 3 is a front, cut-away perspective view of the printer shown in FIG. 1.

In this regard, FIGS. 2 and 3 show close-up cut-away perspective back and front views, respectively, of printer 30. As shown in FIG. 2, printer 30 includes rollers 60 for transporting media from either automatic feeder 34 or manual feeder 37 through printer 30 to media eject port (not shown). Rollers 60 rotate in a counterclockwise direction during media transport, as indicated by arrow 60*a* shown in FIG. 2.

Line feed motor 61 controls the rotation of rollers 60. Line feed motor 61 comprises a 96-step, 2-2 phase pulse motor and is controlled in response to commands received from circuit board 62.

As shown in FIG. 3, printer 30 is a dual-cartridge printer which prints images using two print heads (i.e., one head per cartridge). Specifically, these cartridges are held side-by-side by cartridge receptacles 64*a* and 64*b* such that respective print heads on the cartridges are offset horizontally from each other. Carriage motor 66, shown in FIG. 2, controls the motion and speed of cartridge receptacles 64*a* and 64*b* in both the forward and reverse directions in response to commands received from circuit board 62. Specifically, carriage motor 66 controls the acceleration/deceleration of belt 67, which in turn controls the movement of cartridge receptacles 64a and 64*b* along carriage 69 based on a weight of the number of print heads used and selected printing mode. In this regard, carriage motor 66 provides for bi-directional motion of belt 67, and thus of cartridge receptacles 64*a* and 64*b*. By virtue of this feature, printer 30 is able to print images from both left to right and right to left.

Carriage motor 66 comprises a 96-step, 2-2 phase pulse motor having a carriage resolution of (9/360)inches/pulse. Carriage motor 66 is driven by a motor driver having four level current control. When printer 30 is printing in a 360 dpi mode, carriage motor 66 is driven by variable pulse widths which ensure proper printing speed and quality. For example, carriage motor 66 is driven to cause cartridge receptacles 64*a* and 64*b* to move along carriage 69 at a default speed of 459.32 mm/sec. In contrast, when printer 30 is printing in a 720 dpi mode, carriage motor 66 is driven to cause cartridge receptacles 64*a* and 64*b* to move along carriage 69 at a slower default speed of 352.8 mm/sec.

Carriage motor 66 drives cartridge receptacles 64*a* and 64*b* forward from home position/right-most position 87 of the printing area to a left-most position 89 of the printing area. While not shown, the home position of the print heads includes at least one sensor for sensing the moving delay of the carriage against the operation of carriage motor 66 or a moving delay of the carriage from the left most position of the printer to the home position sensor. In this manner, the total weight of the installed print heads can be calculated. This information is stored in printer 30 for later use when controlling the speed of the carriage motor. In this regard, the method of controlling the acceleration, deceleration and hold time (ensures a stable stop or pause) will be discussed in greater detail below with respect to FIGS. 7 and 8.

Figure 4:
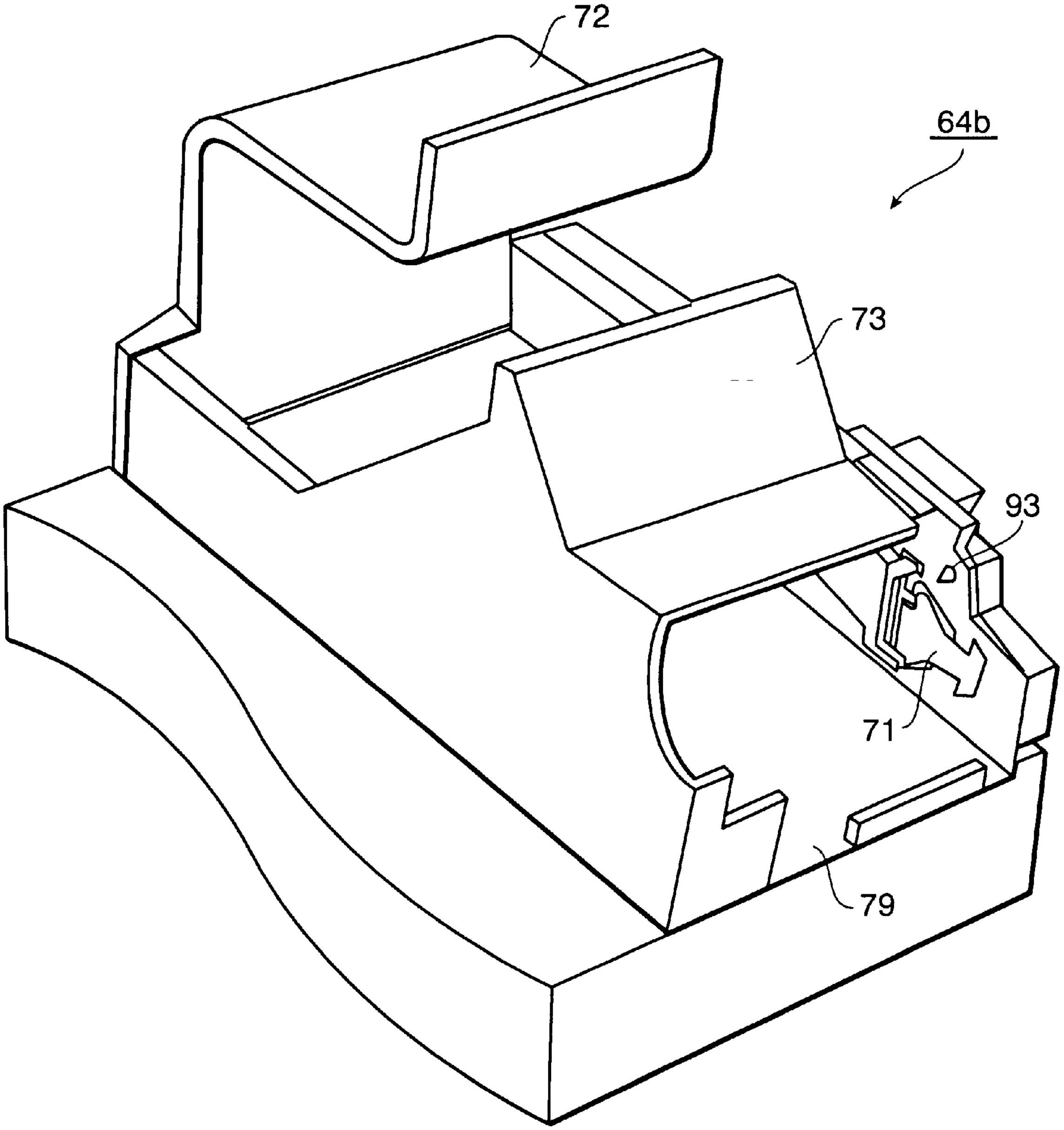
FIG. 4 shows the front view of a cartridge receptacle used in connection with the present invention.

FIG. 4 is a detailed perspective view of cartridge receptacle 64*b* from FIG. 3. Both of cartridge receptacles 64*a* and 64*b* are substantially identical in structure. Accordingly, for the sake of brevity, only cartridge receptacle 64*b* is described in detail herein.

Figure 5:
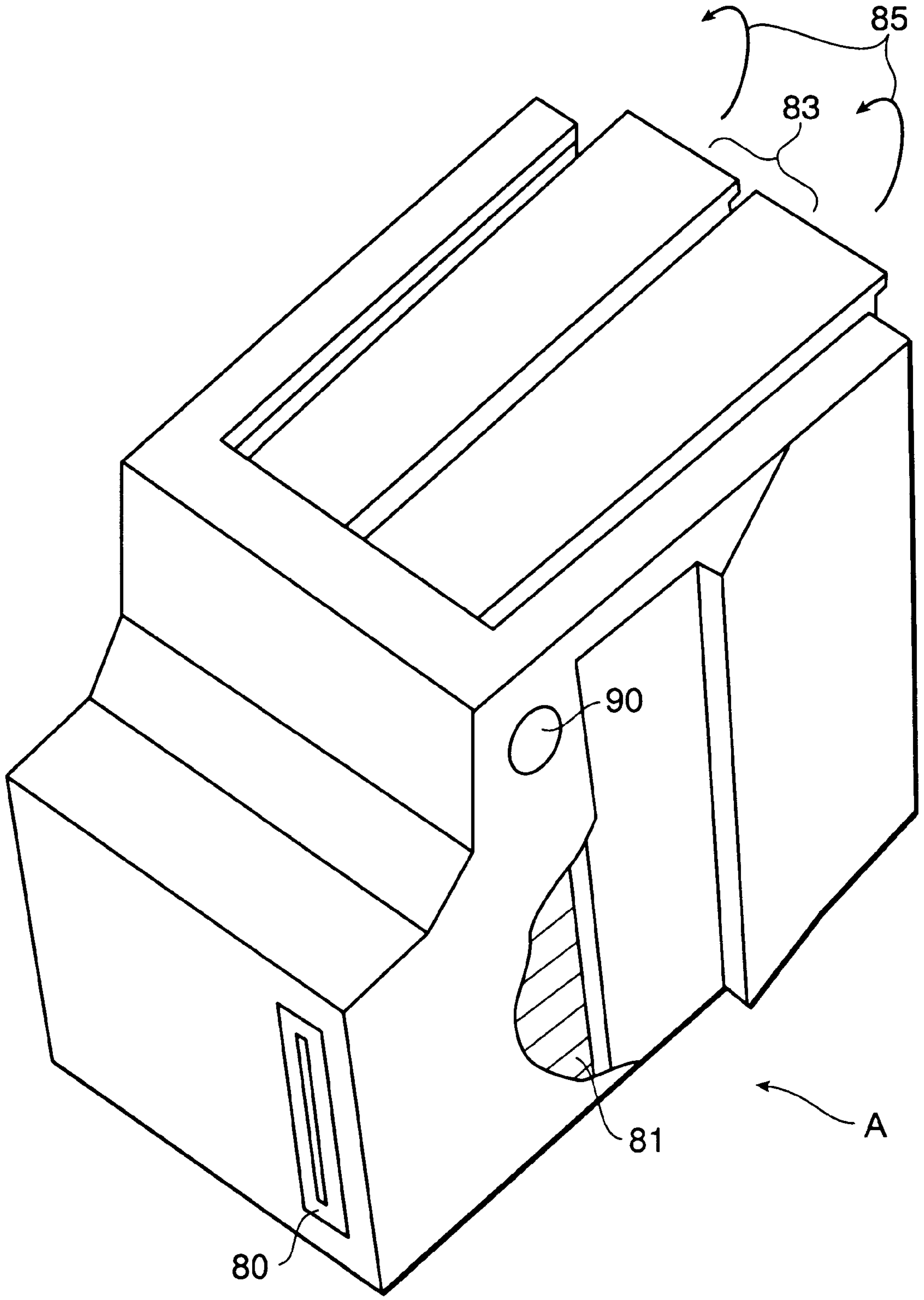
FIG. 5 is an example of a disposable ink cartridge used for the present invention.

Cartridge receptacle 64*b* is used to hold an ink cartridge (which includes a print head and can include one or more removable ink reservoirs for storing ink) in printer 30. In this regard, FIG. 5 shows the configuration of an ink cartridge which may be installed within cartridge receptacle 64*b* (see FIG. 5). As shown in FIG. 5, ink cartridge A comprises print head 80, ink reservoirs 83, cartridge circuit contact 81, and hole 90. At this point, it is noted that the present invention can also be used with ink cartridges that do not contain removable ink reservoirs, but instead store all ink internally in one internal reservoir.

Ink reservoirs 83 are removable from ink cartridge B and store ink used by printer 30 to print images. Specifically, ink reservoirs 83 are inserted within cartridge B and can be removed by pulling along the direction of arrow 85, as shown in FIG. 5. Reservoirs 83 can store color (e.g., cyan, magenta and yellow) ink and/or black ink. Print head 80 includes a plurality of nozzles (not shown) which eject ink from ink reservoirs 83 during printing. Cartridge circuit contact 81 is used by printer 30 to identify the type of print head being used as well as to control operation of the print head. Cartridge hole 90 mates to pin 93 shown in FIG. 4 on cartridge receptacle 64*b* so as to hold ink cartridge B in place.

Returning to FIG. 4, cartridge receptacle 64*b* includes opening 79 at a bottom thereof. A print head, such as print head 80, of an installed cartridge protrudes through opening 79. By virtue of this configuration, the cartridge's print head is able to contact a recording medium in printer 30. Cartridge receptacle 64*b* also includes lever 72 and capsule 73. Lever 72 pivots relative to ink reservoirs of an ink cartridge stored in cartridge receptacle 64*b* such that lever 72 extends over at least a portion of the ink reservoirs, and pivots away from the ink reservoirs so as to permit user access to the ink reservoirs.

Capsule 73 holds the ink cartridge (including the print head and ink reservoirs) within cartridge receptacle 64*b* and is laterally movable within cartridge receptacle 64*b* in response to pivoting of lever 72. By virtue of this lateral motion, a cartridge circuit contact, such as cartridge circuit contact 81 on ink cartridge B, engages and disengages a circuit contact on cartridge receptacle 64*b*, namely device circuit contact 71. This process is used to output a signal between printer 30 and the print head.

During its operation, printer 30 includes different modes, for example, a fine mode for printing high resolution images, which may be set via commands issued to printer 30 by host processor 23 (see FIG. 1). In these modes, cartridges installed in printer 30 may eject different-sized ink droplets to form images having different resolutions.

Both different ink droplet sizes and different carriage speeds are used during different printer operational modes to form images having different resolutions. More specifically, ink jet printers create images by forming dots on a page. The resolution of a formed image corresponds in part to the number of dots formed and the speed or movement of the print head across the print medium. In the printer of the present invention, images can be formed at a variety of different resolutions using either the large or small ink droplets described above and by varying the printer carriage motor's speed which drives the print head carriage.

Figure 6:
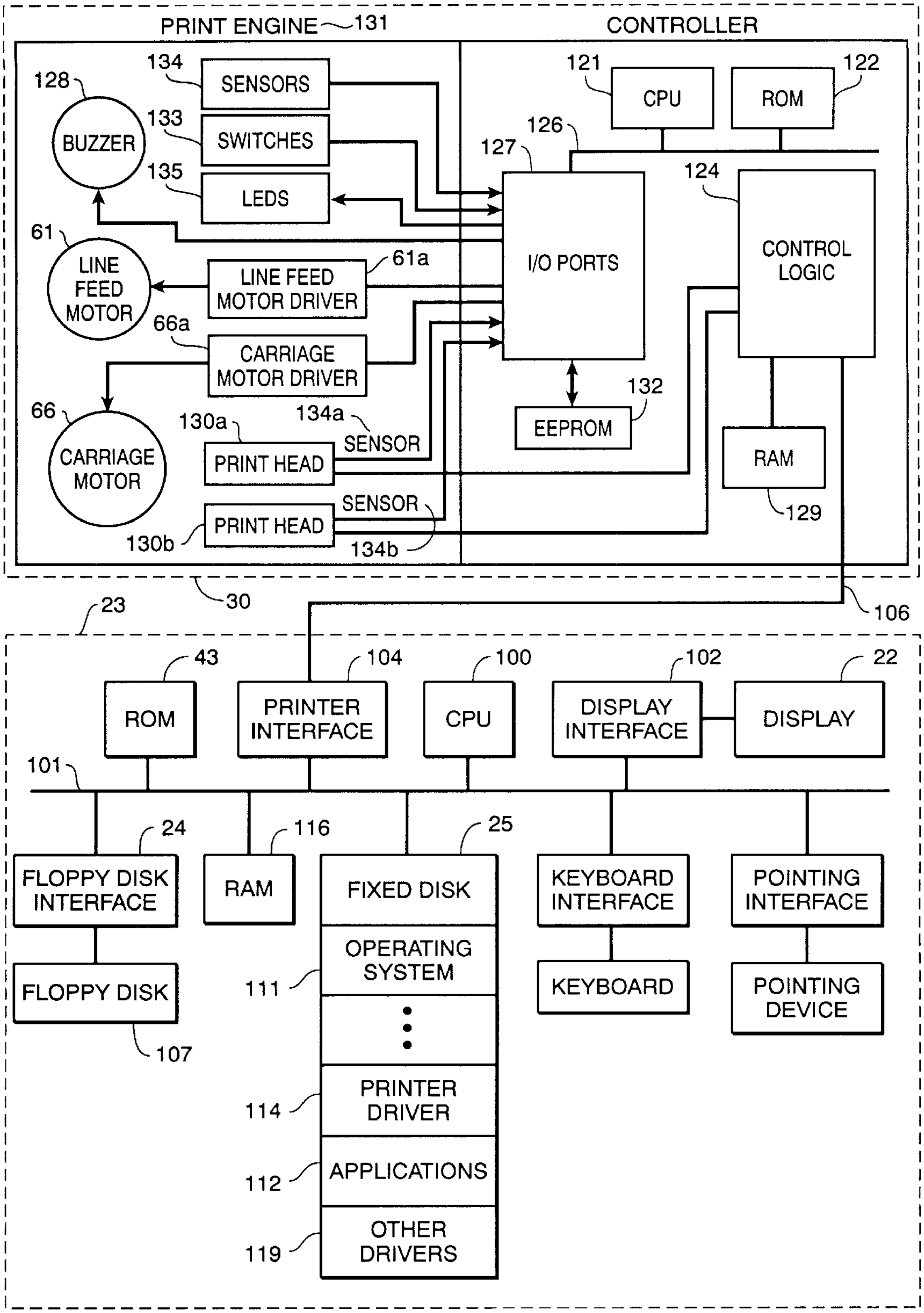
FIG. 6 is a block diagram showing the hardware configuration of a host processor interfaced with the printer of the present invention.

FIG. 6 is a block diagram showing the internal structures of host processor 23 and printer 30. In FIG. 6, host processor 23 includes a central processing unit 100 such as a programmable microprocessor interfaced to computer bus 101. Also coupled to computer bus 101 are display interface 102 for interfacing to display 22, printer interface 104 for interfacing to printer 30 through bi-directional communication line 106. Disk 25 includes an operating system section for storing operating system 111, an applications section for storing applications 112, and a printer driver section for storing printer driver 114.

A random access main memory (hereinafter "RAM") 116 interfaces to computer bus 101 to provide CPU 100 with access to memory storage. In particular, when executing stored application program instruction sequences such as those associated with application programs stored in applications section 112 of disk 25, CPU 100 loads those application instruction sequences from disk 25 (or other storage media such as media accessed via a network or floppy disk drive 24) into random access memory (hereinafter "RAM") 116 and executes those stored program instruction sequences out of RAM 116. RAM 116 provides for a print data buffer used by printer driver 114 according to the invention, as described more fully hereinbelow. Read only memory (hereinafter "ROM") 43 in host processor 23 stores invariant instruction sequences, such as start-up instruction sequences or basic input/output operating system (BIOS) sequences for operation of keyboard 26.

As shown in FIG. 6, and as previously mentioned, disk 25 stores program instruction sequences for a windowing operating system and for various application programs such as graphics application programs, drawing application programs, desktop publishing application programs, and the like. In addition, disk 25 also stores color image files such as might be displayed by display 22 or printed by printer 30 under control of a designated application program. Print data is transferred to printer 30, and control signals are exchanged between host processor 23 and printer 30, through printer interface 104 connected to line 106 under control of the printer driver of printer 30.

Referring again to FIG. 6, printer 30 includes CPU 121 such as an 8-bit or a 16-bit microprocessor including programmable timer and interrupt controller, ROM 122, control logic 124, and I/O ports unit 127 connected to bus 126. Also connected to control logic 124 is RAM 129. Control logic 124 includes controllers for line feed motor 61, for print image buffer storage in RAM 129, for heat pulse generation, and for head data. Control logic 124 also provides control signals for nozzles in print heads 130*a* and 130*b* in the print engine of printer 30, carriage motor 66, line feed motor 61, and print data for print heads 130*a* and 130*b*. EEPROM 132 is connected to I/O ports unit 127 to provide non-volatile memory for printer information such as print head configuration. EEPROM 132 also stores parameters that identify the printer, the driver, the print heads, alignment of the print heads, the status of ink in the cartridges, weight of cartridges, number of ink drops output, etc., which are sent to the printer driver of host processor 23 to inform host processor 23 of the operational parameters of printer 30.

I/O ports unit 127 is coupled to print engine in printer 30 in which a pair of print heads 130*a* and 130*b* (which would be stored in cartridge receptacles 64*a* and 64*b*, respectively) perform recording on a recording medium by scanning across the recording medium while printing using print data from a print buffer in RAM 129. Control logic 124 is also coupled to printer interface 104 of host processor 23 via communication line 106 for exchange of control signals and to receive print data and print data addresses. RAM 129 stores print data in a print buffer defined by the printer driver of printer 30 for print heads 130*a* and 130*b* and other information for printer operation. ROM 122 stores carriage motor acceleration/deceleration and hold time control functions, program instruction sequences used to control printer 30, and other invariant data for printer operation. In this regard, the carriage motor control functions which relate to acceleration/hold time and deceleration/hold time may be stored in ROM 122 as separate look-up tables, each of which correspond to a different print mode and print head configuration. For example, ROM 122 may store acceleration/hold time look-up tables for the following: two print heads and high resolution printing; two print heads and normal print resolution in the forward direction; two print heads and normal print resolution printing in the reverse direction; one print head and high resolution printing; and one printhead and normal print resolution in bi-directional. Each of the above noted tables would also have a corresponding deceleration/hold time table.

While tables such as those discussed above may be used, one single look-up table with the above entries may be used instead.

Print heads 130*a* and 130*b* of print engine 131 correspond to ink cartridges that are stored in cartridge receptacles 64*a* and 64*b*, respectively. Sensors generally indicated as 134*a* and 134*b* are arranged in the printer's print engine to detect print head status, print head and cartridge weight and to identify printhead type.

The process by which printer 30 controls the printer carriage motor speed will now be discussed in greater detail with respect to FIGS. 6 through 8. Upon receiving a print job from host processor 23, through printer interface 104 of host processor 23, the print job which includes print commands are received by control logic 124 of printer 30. Control logic 124 stores the print job into RAM 129. CPU 121 of printer 30 determines the type of print mode to execute based on printer command included with print job. In this regard, CPU 121 determines whether the print job is a high resolution/fine mode or default resolution/normal mode. After determining which type of resolution/mode the image data is to be printed in, CPU 121 determines which motor control functions to select based on the resolution/mode and number and weight of print heads loaded in the printer. Based on this information, CPU 121 selects an appropriate motor control function in order to control carriage motor 66 during the printing operation.

Figure 7:
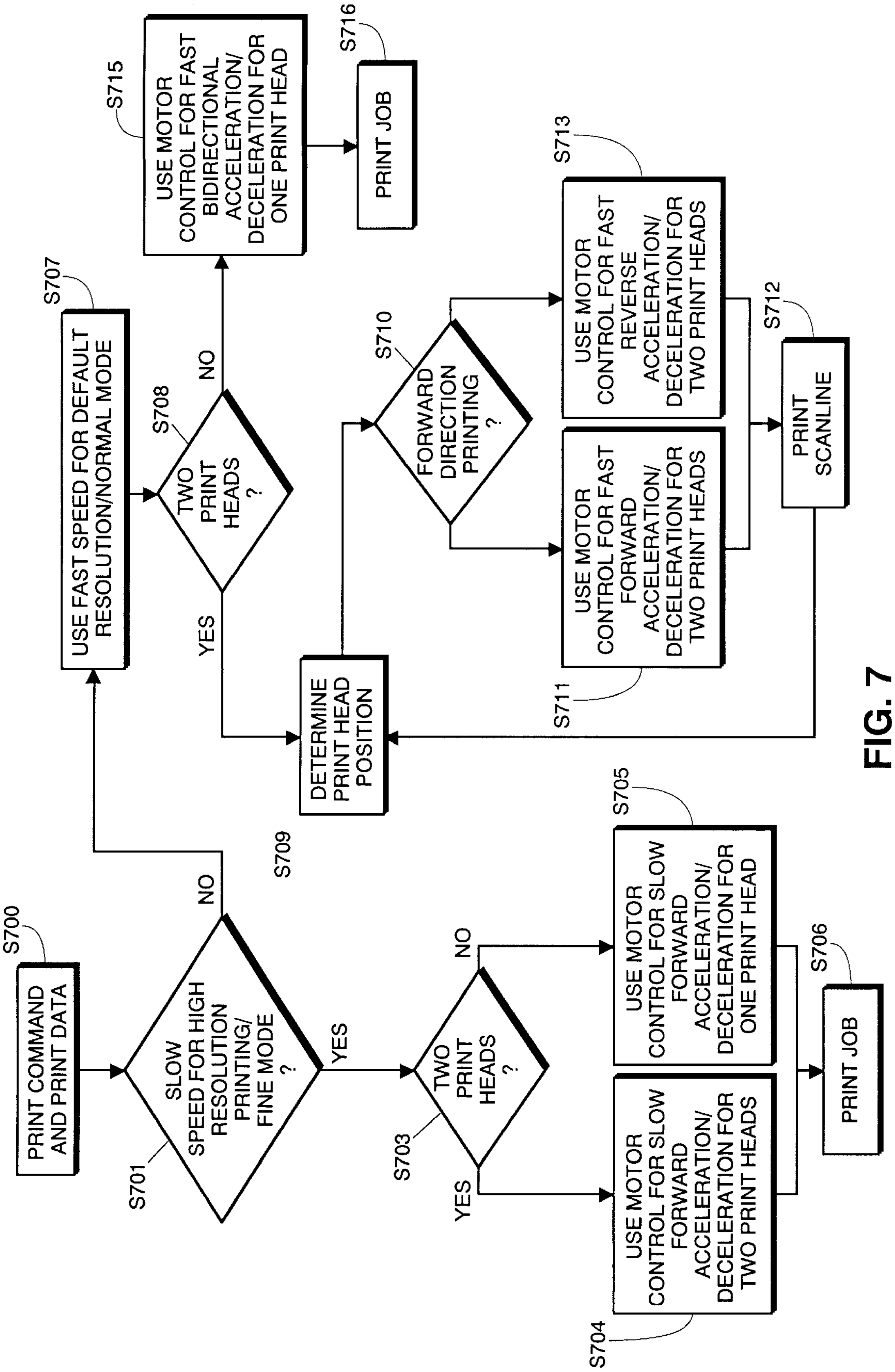
FIG. 7 is a flow chart for describing control of the printer motor carriage based on the number of print heads used by multiple print head printer and the type of printing to be performed.

Thus, in step S700, in FIG. 7, printer 30 receives the print command. The print command and print data are sent from host processor 23 through printer interface 104 and cross bi-directional line 106. The print commands and data are received by control logic 124 of printer 30 and the print data is stored in RAM 129. In step S701, CPU 121 determines whether the print job is to be printed in a slow speed for high resolution printing/fine mode or if the print data is to be printed in a high resolution/fine mode. If the print data is to be printed in high resolution, a slow carriage motor speed is required. Accordingly, flow proceeds to step S703 and CPU 121 determines if two print heads are installed in printer 30. As described previously, this information can be detected when cartridge circuit contact 81 makes electrical contact to device circuit contact 71 in cartridge receptacles 64*a* and 64*b*. The existence/absence of the print head in the cartridge receptacle is then detected by sensors 134*a* and 134*b* and is output to CPU 121.

In step S703, if CPU 212 determines that two print heads exist, flow proceeds to step S704. In step S704, CPU 121 retrieves from ROM 122 the appropriate carriage motor control functions for acceleration/deceleration, and hold time functions for both acceleration and deceleration for two print heads printing in high resolution/fine mode. Specifically, based on the print resolution/mode and number of print heads, CPU 121 retrieves from ROM 122 pulse width data which controls acceleration and hold time and deceleration and hold time of carriage motor 66. As a result, pulse width data is retrieved and output to carriage motor 66 to ensure that the print job will be printed at the appropriate speed for two print heads printing at high resolution. In addition to retrieving the control functions for acceleration/deceleration of two print heads, CPU 121 also retrieves hold times which are associated with both the acceleration and deceleration functions. The hold times are used to ensure a stable stop and start position of the 96-step phase pulse motor of carriage motor 66. As mentioned above, the information which is retrieved from ROM 122 can be stored tables as both acceleration tables and deceleration tables for each combination of number of print heads and type of print mode.

Once the carriage motor control functions are retrieved, the pulse width data is used to drive carriage motor 66 for the entire print job in step S706.

Reverting back to 703, in the case that CPU 121 detects only a single print head installed in printer 30, flow proceeds to step S705. In step S705, CPU 121 selects the appropriate motor control for a slow forward acceleration/deceleration functions for a single print head from ROM 122. As noted previously, the acceleration/deceleration, as well as the hold time, may all be located in a single table within ROM 122 or may be separated into acceleration and deceleration tables separately having their own respective hold times.

Once the control functions are retrieved, the pulse width data is used to drive carriage motor 66 for the entire print job in step S706. Returning to step S700, if it is determined in step S701 that the print data is not to be printed at a slow speed to obtain a resolution/fine mode, flow proceeds to step S707. In step S707, CPU 121 determines that a fast speed for the carriage motor is required for a default resolution/normal mode. However, before selecting the appropriate carriage motor speed, CPU 121 determines in step S708 whether or not there are two print heads installed in printer 30.

In step S708, CPU 121 detects if one or more print heads exist in printer 30. As noted previously, this information is determined by sensors 134*a* and 134*b* which detect contact between cartridge circuit contact 81 and device circuit contact 71 in the cartridge receptacle.

If two print heads are installed in printer 30, flow proceeds to step S709. In step S709, CPU 121 determines the last location of the print heads following the last scan line printing. In this regard, CPU 121 maintains a log of the last print position and, therefore, can readily determine print head location. For example, CPU 121 can determine where the print heads are located based on the last pass of the print heads across the printing area, i.e., at the right-most position of the printing area or the left-most position of the printing area. Based on this information, CPU 121 determines whether to control carriage motor 66 to move in a forward or a reverse direction. Flow proceeds to step S710 at which point CPU 121 determines if the print data should be printed in the forward direction based on the last print head location. In the case the data is to be printed in the forward direction, flow proceeds to step S711. In step S711, CPU 121 selects the appropriate control functions for fast forward acceleration with hold time and fast forward deceleration with hold time from tables stored in ROM 122. On the other hand, if the print data is to be printed in the reverse print direction, CPU 121 selects the appropriate control function tables for printing the print data in a fast-reverse acceleration with hold time and fast-reverse deceleration with hold time in step S713.

In either case, once the carriage motor control functions are retrieved, CPU 121 uses the pulse width data to drive carriage motor 66 to print only a single scan line in step S712. After printing the single scan line, flow returns to step S709 and repeats the process in steps S711 through S713 until the entire print job is completed.

Returning to step S708, in the case CPU 121 determines that only a single print head has been installed in printer 30, flow proceeds to step S715. In step S715, CPU 121 selects the appropriate control function tables which provide for fast bi-directional acceleration and deceleration with their respective hold times for the single print head. In step S716, CPU 121 uses the carriage motor control functions to output pulse width data signals to carriage motor 66 to drive carriage motor 66. In this fashion, the single print head will print in both the forward and reverse direction until the print job is completed.

Since it is possible for a user to exchange or remove a print head, before or during a print job, the process described in FIG. 7 may be repeated before every print job and/or upon an indication that the cover of the printer (not shown) has been opened and closed. For example, when a user changes a cartridge, the user opens the cover and the printer carriage moves to the center of printer 30. However, prior to replacing a cartridge, carriage motor 66 is controlled based on a table suitable for moving the cartridge(s) previously mounted on the printer carriage. Therefore, after the user has replaced the cartridge, CPU 121 of printer 30 can determine the type and number of cartridges from the output of circuit contact 71. Just after the cartridge change, CPU 121 selects a new table which is suitable for moving the newly installed cartridge.

According to the structure, when the carriage is moved initially (for example, return to home position) after the cartridge change, CPU 121 can use a suitable table to control the operation of printer carriage motor 66.

Although the preferred embodiment of the present invention has been described as including preset acceleration/deceleration and/or hold time tables in ROM 122, these tables may be generated each time upon insertion of a new print head. Additionally, the weight of the print head and cartridge may be used to generate the acceleration/ deceleration table by measuring the weight by the home position sensor and then calculating a movement acceleration/deceleration of the carriage motor based on the entire weight of the print heads and cartridges installed in the printer.

Because the weight of a print head and cartridge change as ink is ejected from the print head, it is advantageous to also alter the acceleration/deceleration characteristics of the carriage motor by generating new acceleration/deceleration tables periodically based on periodically sensing weight of each print head and cartridge. Alternatively, the weight of each print head and cartridge can be calculated by subtracting the amount of ejected ink droplets, stored in memory, from the total weight of the print head and cartridge at the time of initial installation.

Carriage motor control can also be effected based not only on number and weight of installed print heads, as described above in the preferred embodiment, but also based on ink cartridge type, for example, black ink, color ink, dye ink, photo ink, etc., and/or based on location of installed print head within a multi-head printer, i.e., whether a single print head is installed in the left or right cartridge receptacle.

Figure 8:
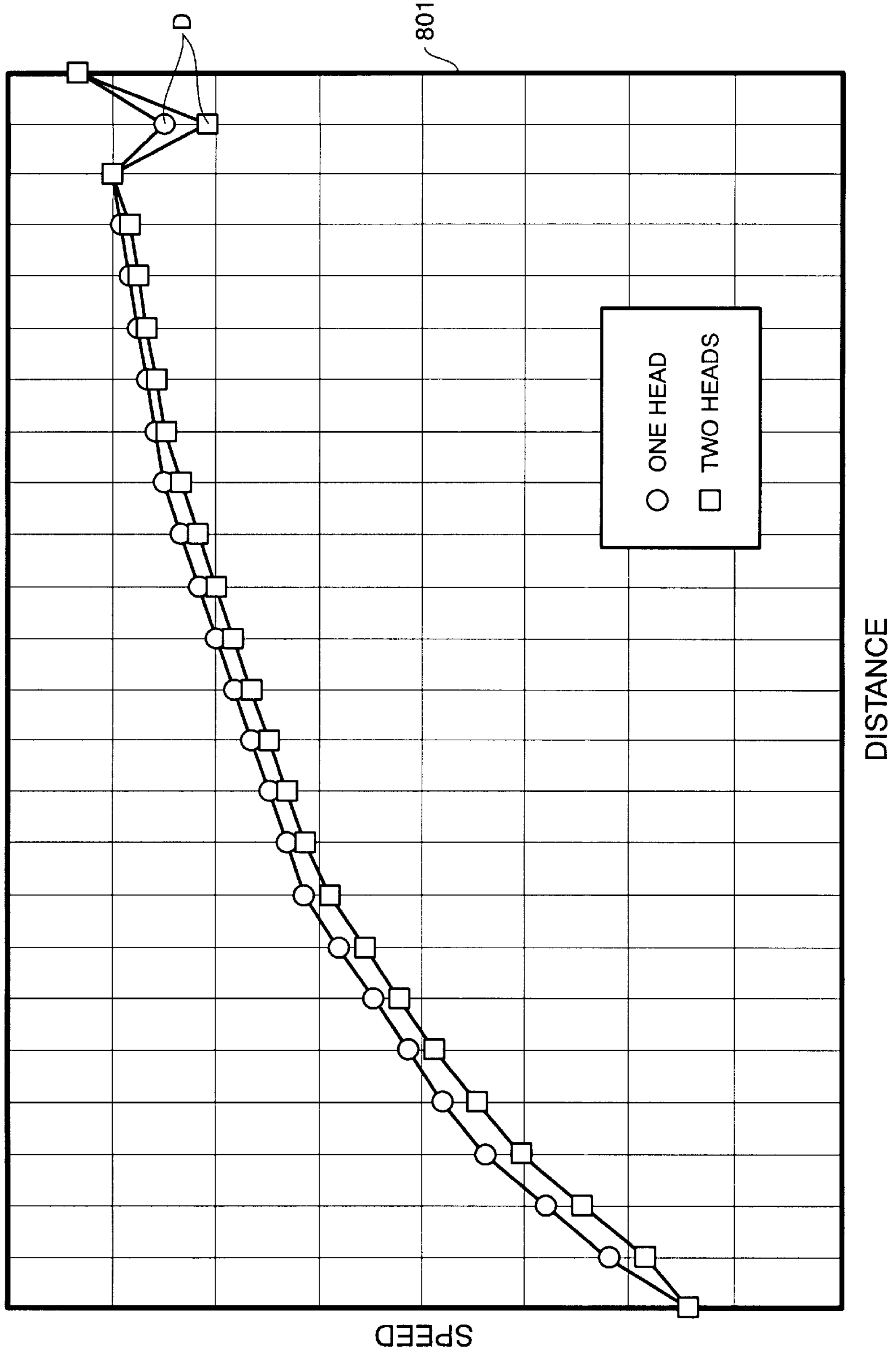
FIG. 8 is a graph showing the resulting speed of the carriage motor over a specific distance for both single print head and double print head arrangements.

FIG. 8 is a graph showing the result of using the processing in FIG. 7. As shown in FIG. 8, graph 801 shows that for both single print head and two print head printing, the speed of the carriage motor over a specified distance are substantially the same despite the difference in weight between a two-head configuration and a single-head configuration. This results in efficient and accurate printing of the print data stored in RAM 129. For both a single print head and two print head configurations, graph 801 depicts a sharp decrease in speed at D. This point on the graph indicates a first deceleration of carriage motor 66 before the end of printing a scan line.

What is claimed is:

1. In a multiple print head printer in which print heads are removable and exchangeable, a method of controlling a printer carriage motor comprising the steps of:

receiving a print job, said print job comprising print commands and print data;

detecting a status of print heads installed in said multiple print head printer;

selecting a motor control function for controlling operational speed and direction of the printer carriage motor based on the detected status of print heads, wherein the status of print heads installed includes at least a number of print heads currently installed in the multiple print head printer.

2. A method according to claim 1, further comprising the step of determining a type of print mode to print the print data based on the received print commands.

3. A method according to claim 1, wherein the detecting step detects a number of print heads currently installed in the multiple print head printer.

4. A method according to claim 1, wherein, in the selecting step, the selected operational speed of the printer carriage motor is determined based on whether either a fine printing mode or normal printing mode is to be used and based on a combined weight of a detected number of print heads.

5. A method according to claim 1, further comprising the step of outputting a predetermined pulse width based on the selected operational speed to control acceleration and deceleration of the printer carriage motor.

6. A method according to claim 1, further comprising the step of printing the print data in the determined print mode using the selected operational speed and direction.

7. A method according to claim 1, further comprising the step of storing, in a non-volatile memory, look-up tables having a plurality of control functions for controlling the speed and direction of the carriage motor based on a weight of the detected number of print heads.

8. A method according to claim 1, further comprising the step of storing, in a non-volatile memory, look-up tables having a plurality of control functions for controlling the speed and direction of the carriage motor based on a weight of the detected number of print heads based on a determined print mode and a weight.

9. A method according to claim 1, further comprising the step of printing the print data in the determined print mode using the selected operational speed and direction.

10. In a multiple print head printer in which print heads are removable and exchangeable, a method of controlling a printer carriage motor comprising the steps of:

receiving a print job, said print job comprising print commands and print data;

determining a type of print mode to print the print data based on the received print commands;

detecting a number of print heads installed in the multiple print head printer;

determining a total print head weight of the detected number of installed print heads; and selecting an operational speed for the printer carriage motor based on the determined printing mode and total print head weight.

11. A method according to claim 10, further comprising the step of printing the print data in the determined print mode using the selected operational speed and direction.

12. A method according to claim 10, further comprising the step of storing, in a non-volatile memory, look-up tables having a plurality of control functions for controlling the speed and direction of the carriage motor based on a weight of the detected number of print heads.

13. A method according to claim 10, further comprising the step of storing, in a non-volatile memory, look-up tables having a plurality of control functions for controlling the speed and direction of the carriage motor based on a weight of the detected number of print heads and on a determined print mode.

14. In a multiple print head printer which receives print commands and in which print heads are removable and exchangeable from a printer carriage, a method of controlling a printer carriage motor comprising the steps of:

detecting a number of print heads installed in said multiple print head printer; and selecting a motor control function, from among at least two motor control functions, for controlling operational speed and direction of the printer carriage motor based on the detected number of print heads and received print commands.

15. A method according to claim 14, further comprising determining a type of print mode to execute based on the received print commands.

16. A method according to claim 15, wherein in the selecting step, a selected motor control function is used based on a weight of the detected number of print heads.

17. A method according to claim 14, further comprising the step of storing, in a non-volatile memory, look-up tables having a plurality of control functions for controlling the speed and direction of the printer carriage motor based on a weight of the detected number of print heads.

18. A method according to claim 14, further comprising the step of storing, in a non-volatile memory, look-up tables having a plurality of control functions for controlling the speed and direction of the printer carriage motor based on a weight of the detected number of print heads and on a determined print mode.

19. A method according to claim 14, wherein, in the determining step, it is determined whether to execute a high resolution print mode or a default print mode and, wherein in the selecting step, a motor control function is selected based on the detected number of print heads and whether printing is to be executed in high resolution print mode or default print mode.

20. A method according to claim 14, further comprising the step of directing the printer carriage motor to move based on a position of the printer carriage, wherein, if the printer carriage is at a right-most position of a printing area, the printer carriage motor is driven to a left-most position in order to print one scan line and, if the printer carriage is at the left-most position of the printing area, the printer carriage motor is driven to a right-most position.

21. A method according to claim 18, further comprising the step of printing the print data in the determined print mode using the selected operational speed and direction.

22. A method according to claim 15, wherein in the step of directing the printer carriage motor to move is repeated for each scan line of print data.

23. In a multiple print head printer which receives print commands and in which print heads are removable and exchangeable from a printer carriage, a method of controlling a printer carriage motor comprising the steps of:

detecting a number of print heads installed in the multiple print head printer;

determining a total print head weight of the detected number of installed print heads; and selecting an operational speed for the printer carriage motor based on total print head weight.

24. A method according to claim 23, further comprising determining a type of print mode to execute based on the received print commands.

25. A method according to claim 23, further comprising the step of storing, in a non-volatile memory, look-up tables having a plurality of control functions for controlling the speed and direction of the printer carriage motor based on a weight of the detected number of print heads.

26. A method according to claim 23, further comprising the step of storing, in a non-volatile memory, look-up tables having a plurality of control functions for controlling the speed and direction of the printer carriage motor based on a weight of the detected number of print heads and on a determined print mode.

27. A method according to claim 23, wherein, in the determining step, it is determined whether to execute a high resolution printing mode or a default printing mode and wherein, in the selecting step, a motor control function is selected based on the detected number of print heads and whether printing is to be executed in high resolution print mode or default print mode.

28. In a multiple print head printer which receives print commands and in which print heads are removable and exchangeable from a printer carriage, a method of controlling a printer carriage motor comprising the steps of:

detecting a number of print heads installed in the multiple print head printer;

determining a total print head weight of the detected number of installed print heads;

selecting an operational speed for the printer carriage motor based on total print head weight; and directing the printer carriage motor to move based on a position of the printer carriage, wherein, if the printer carriage is at a right-most position of a printing area, the carriage motor is driven to a left-most position in order to print one scan line and, if the printer carriage is at the left-most position of the printing area, the carriage motor is driven to the right-most position.

29. A method according to claim 25, wherein, in the step of directing, the printer carriage motor to move is repeated for each scan line of print data.

30. A multiple print head printer having at least one print head comprising:

a bi-directional printer interface for receiving print data and print commands from a host system;

a carriage motor for driving a printer carriage;

a controller for controlling operations of the printer;

a volatile memory for storing print data and print commands received from the host system;

a non-volatile memory for storing at least a printer driver and carriage motor control functions;

at least two print head receptacles, each receptacle holding a single print head;

at least two print head sensors for detecting print heads held in the at least two print head receptacles, wherein, when the host system downloads a print job containing print data and print commands to the multiple print head printer over the bi-directional interface, the controller 1) stores the received print job in the volatile memory, 2) determines a type of print mode to execute based on the received print commands, 3) detects, based on the detection by the print head sensors, a number of print heads held in each of the at least two print head receptacles, 4) selects a carriage motor control function from the non-volatile memory for controlling an operational speed and direction of the carriage motor based on the determined type of print mode and the detected number of print heads, and 5) controls the at least two print head receptacles to move across a printing area scan line by scan line.

* * * * *